(12) United States Patent
Liang

(10) Patent No.: US 6,520,564 B1
(45) Date of Patent: Feb. 18, 2003

(54) AIR FLOW GUIDING BOARD STRUCTURE OF AN AUTOMOBILE

(75) Inventor: Lien-Feng Liang, Changhua Hsien (TW)

(73) Assignee: Yet Chang Mobile Goods Co., Ltd., Changhua Hsien (TW)

( * ) Notice: Subject to any disclaimer, the term of this patent is extended or adjusted under 35 U.S.C. 154(b) by 0 days.

(21) Appl. No.: 10/046,677

(22) Filed: Jan. 16, 2002

(51) Int. Cl.⁷ ............................................... B62D 35/00
(52) U.S. Cl. ...................... 296/180.5; 180/903
(58) Field of Search .................. 296/180.1, 180.5, 296/180.3, 76; 180/903

(56) References Cited

U.S. PATENT DOCUMENTS 4,629,240 A * 12/1986 Dornier
5,165,751 A * 11/1992 Matsumoto et al. ..... 296/180.5
5,356,195 A * 10/1994 Kanda ..................... 296/180.1
5,678,884 A * 10/1997 Murkett et al. .......... 296/180.1
5,863,090 A *  1/1999 Englar .................... 296/180.1

FOREIGN PATENT DOCUMENTS

JP       60-234075   * 11/1985
JP       2-6281      *  1/1990

* cited by examiner

Primary Examiner—Joseph D. Pape
(74) Attorney, Agent, or Firm—Harrison & Egbert

(57) ABSTRACT

An air flow guiding board structure includes a fixed board, a movable board, two fastening seats, and two elastic connection members. The fixed board is secured to the fastening seats. The movable board is pivoted to the fixed board in conjunction with the elastic connection members such that the movable board is capable of moving up and down in response to the air flow intensity so as to stabilize the body of an automobile in high speed motion.

2 Claims, 7 Drawing Sheets

AIR FLOW GUIDING BOARD STRUCTURE OF AN AUTOMOBILE

BACKGROUND OF THE INVENTION

1. Field of the Invention

The present invention relates generally to the automobile accessories, and more particularly to an air flow guiding board which is mounted on the trunk lid of an automobile for stabilizing the body of the automobile in high speed motion.

2. Description of Related Art

As shown in FIG. 1, a prior art air flow guiding board 10 is mounted on an automobile trunk lid 11 for stabilizing the body of the automobile which is cruising at a high speed. The conventional air flow guiding boards are generally of a single-piece or dual-piece construction and are either fixed or movable. As shown in FIG. 2, a conventional fixed board 10 is mounted securely on a fastening seat 13 of an automobile trunk lid by a plurality of fastening bolts 12. The fixed board 10 is incapable of a fluttering movement in response to the air flow intensity and is therefore ineffective. As shown in FIG. 3, a conventional movable board 101 is pivotally fastened to a fastening seat 13 of an automobile trunk lid such that a front end 14 and a rear end 15 of the board 101 are capable of vibrating in response to the air flow intensity. A spring 16 is mounted between the front end 14 of the board 101 and the fastening seat 13. In view of the fact that the board 101 is pivoted at the center thereof to the fastening seat 13, the center serves as a point of support on which the board 101 swivels. The front end 14 and the rear end 15 of the board 101 move up and down. As a result, such a conventional movable board 101 as described above must be of a single-piece construction. An air flow guiding board of the dual-piece construction is formed of a movable board and a fixed board and is apt to bring about an air turbulence.

BRIEF SUMMARY OF THE INVENTION

The primary objective of the present invention is to provide an automobile air flow guiding board structure which is free of the deficiencies of the prior art air flow guiding boards described above.

In keeping with the principle of the present invention, the foregoing objective of the present invention is achieved by an air flow guiding board structure comprising a fixed board, a movable board, two fastening seats, and two elastic connection members. The fixed board is secured to the fastening seats. The movable board is pivoted to the fixed board in conjunction with the elastic connection members such that one end of the movable board is capable of moving up and down in response to the air flow intensity.

The features and the advantages of the present invention will be more readily understood upon a thoughtful deliberation of the following detailed description of the present invention with reference to the accompanying drawings.

DETAILED DESCRIPTION OF THE INVENTION

Figure 1:
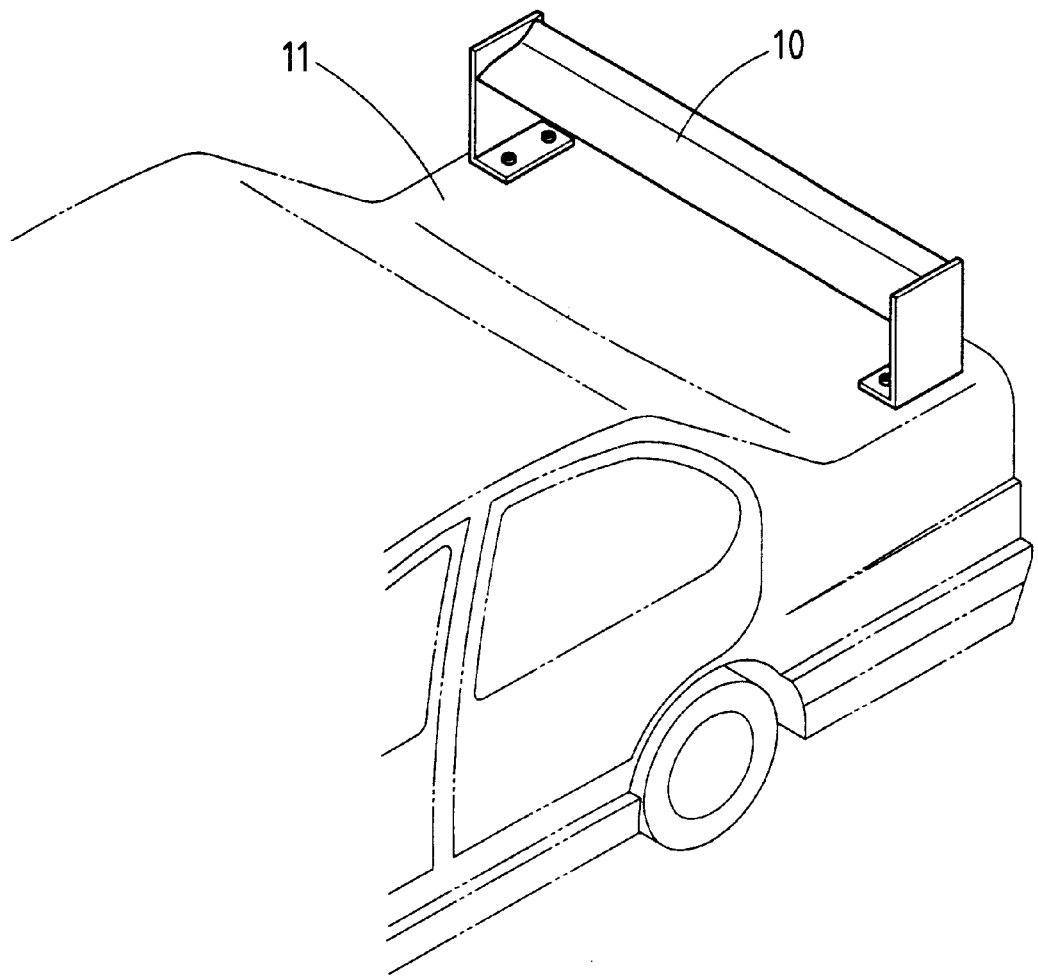
FIG. 1 shows a schematic view of a prior art air flow guiding board which is mounted on an automobile trunk lid.
Figure 2:
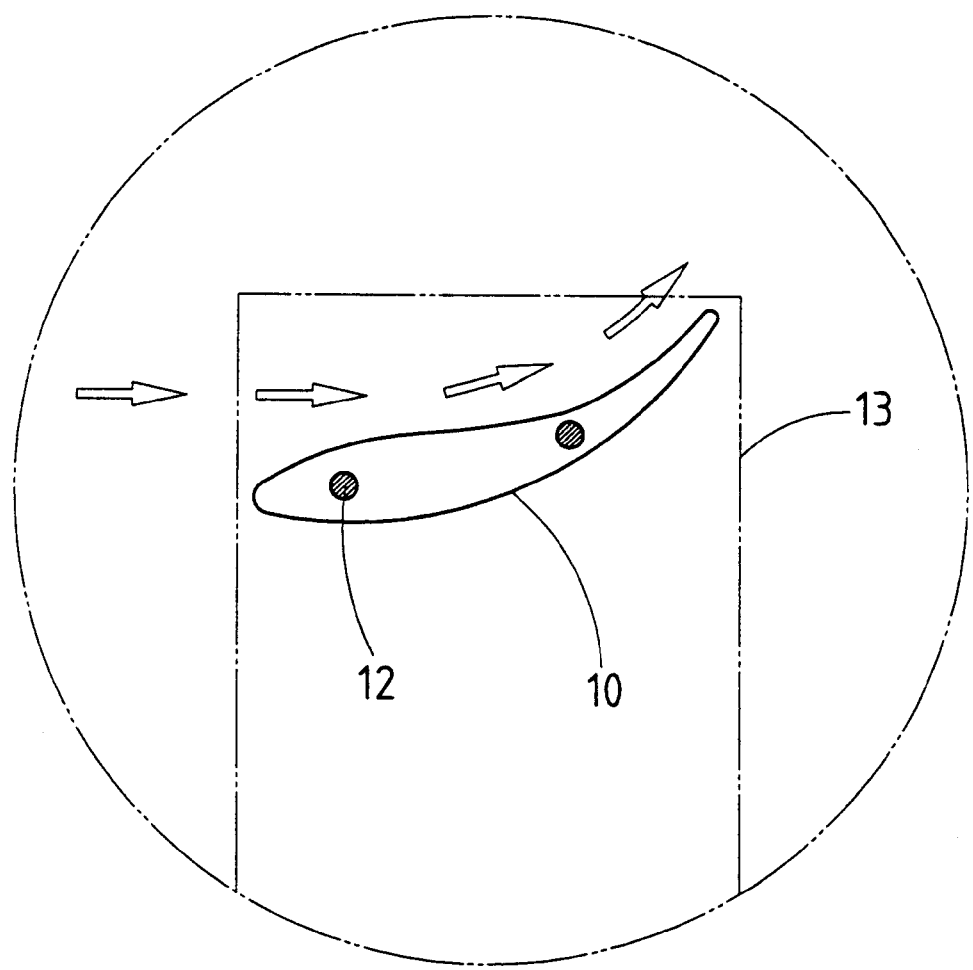
FIG. 2 shows a schematic plan view of a fixed air flow guiding board of the prior art.
Figure 3:
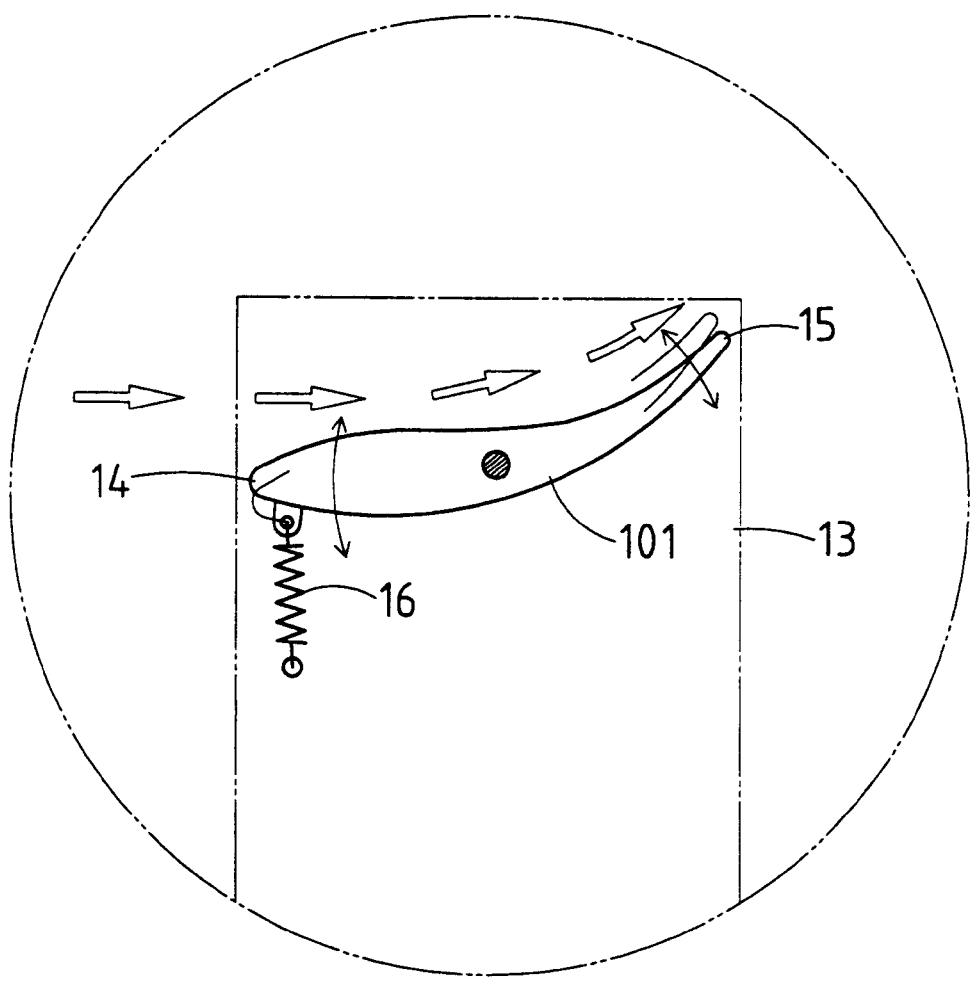
FIG. 3 shows a schematic plan view of a movable air flow guiding board of the prior art.
Figure 4:
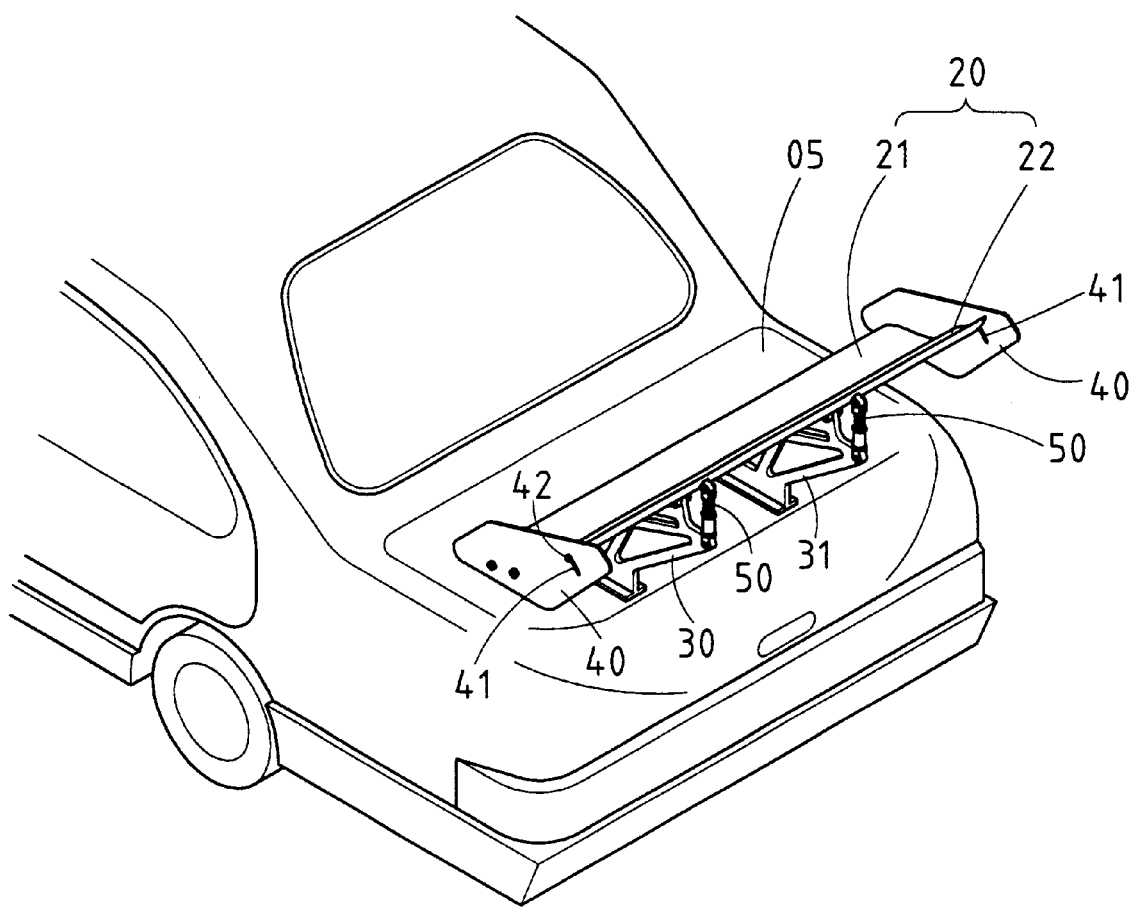
FIG. 4 shows a schematic view of the present invention along with an automobile trunk lid on which the present invention is mounted.
Figure 5:
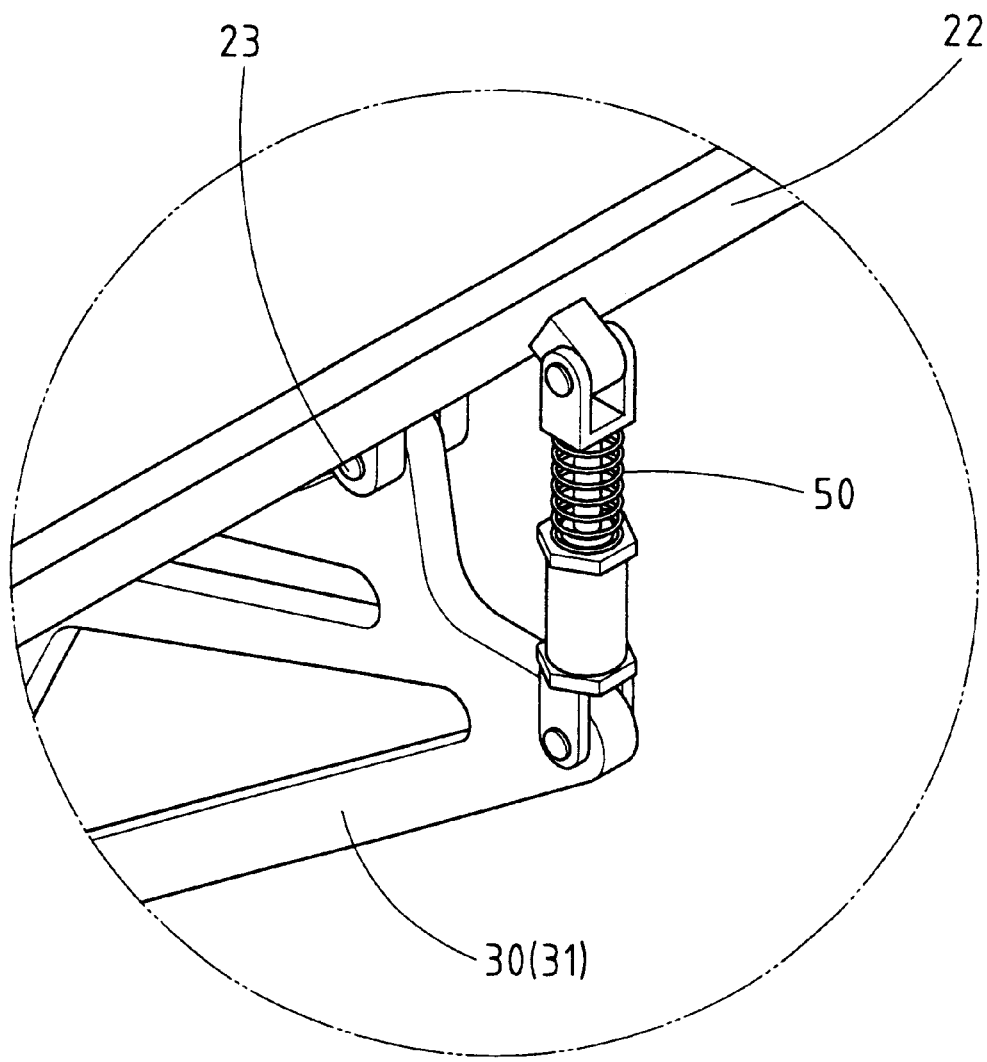
FIG. 5 shows a partial enlarged schematic view of the present invention.

As shown in FIGS. 4–7, an air flow guiding board embodied in the present invention is mounted on an automobile trunk lid 05 and is formed of a main body 20, two fastening seats 30 and 31, two wing plates 40, and two elastic connection members 50.

The main body 20 is formed of a fixed board 21 and a movable board 22. The fixed board 21 is located on the automobile trunk lid 05 such that the fixed board 21 is separated from the trunk lid 05 by a predetermined distance. The movable board 22 is pivotally mounted to the fastening seat and extends slantingly upwardly from the rear longitudinal side of the fixed board 21 such that the sloping surface of the movable board 22 and the upper surface of the fixed board 21 form a predetermined angle.

The two fastening seats 30 and 31 are mounted on the automobile trunk lid 05 such that they are separated from each other by an appropriate distance. The main body 20 is mounted on the two fastening seats 30 and 31.

The two wing plates 40 are fastened to the two longitudinal ends of the fixed board 21 such that the wing plate surfaces and the longitudinal end surfaces form a right angle. The two wing plates 40 are provided in a rear side thereof with an arcuate guide slot 41 corresponding in profile to a moving path of two longitudinal ends of the movable board 22. The arcuate guide slots 41 receive the two longitudinal ends of the movable board 22 by a bolt 42 for guiding the fluttering movement of the movable board 22.

The two elastic connection members 50 are disposed between the movable board 22 and the fastening seats 30 and 31, so as to enable the movable board 22 to move up and down on a bolt 23 which is used to pivot the movable board 22 to the fastening seats 30 and 31. The connection members 50 comprise a compression spring.

Figure 8:
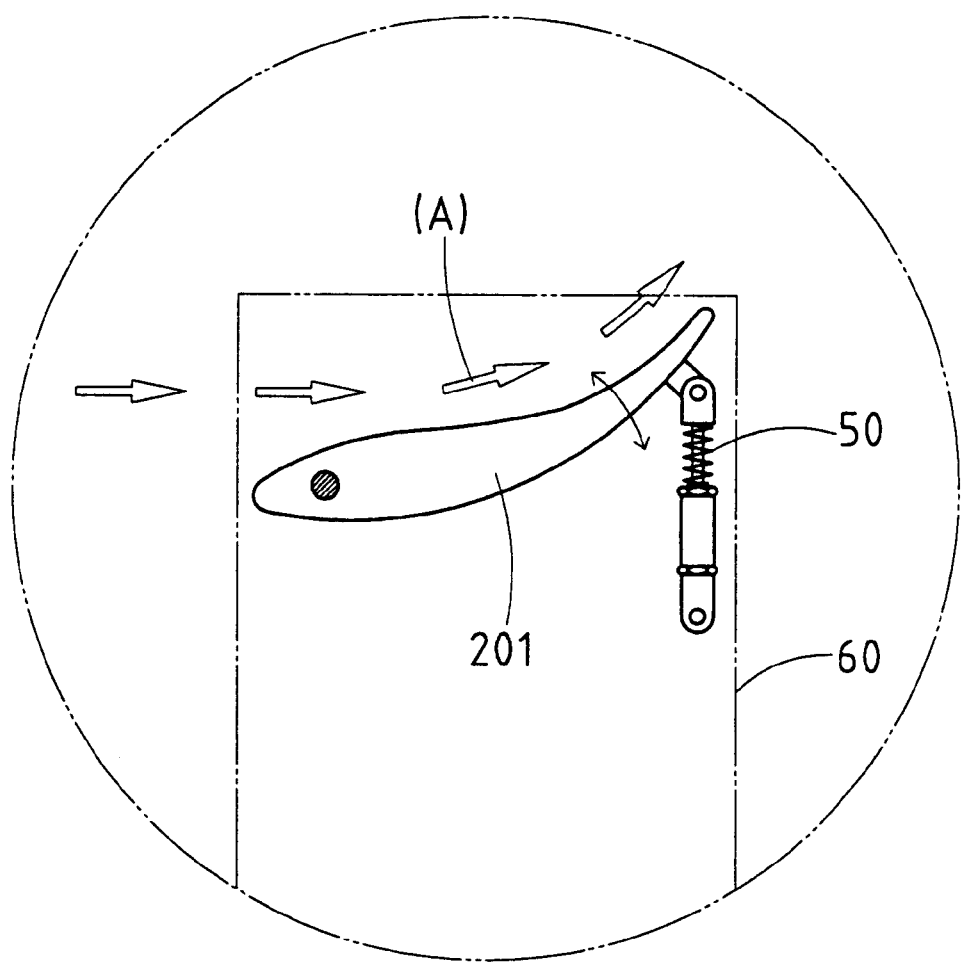
FIG. 8 shows a schematic view of another preferred embodiment of the present invention.

As shown in FIG. 8, the main body of the present invention is of a single-piece construction and is formed of a single-piece board 201, which is fastened pivotally to a fastening seat 60 in conjunction with the elastic connection member 50.

Figure 6:
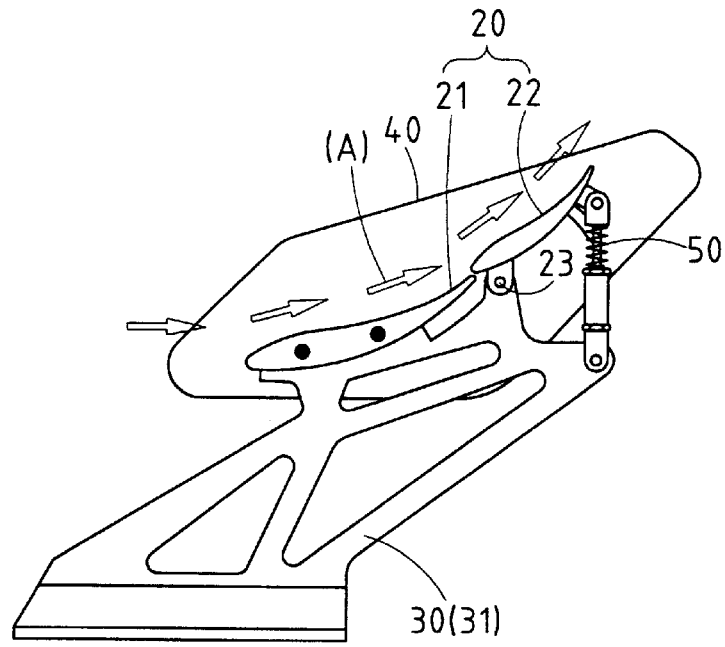
FIG. 6 shows a schematic view of the present invention at work.
Figure 7:
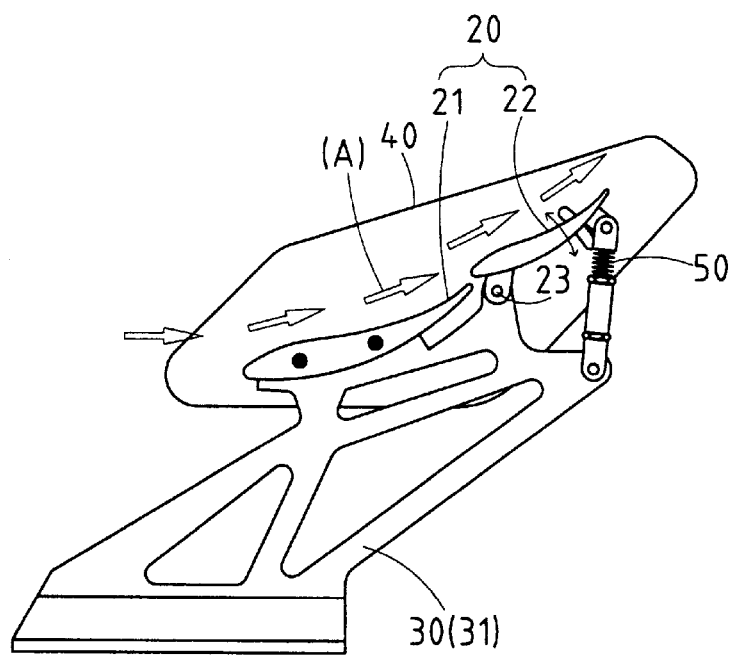
FIG. 7 shows another schematic view of the present invention at work.

The movable board 22 is capable of moving up and down in response to the intensity of air flow "A", as illustrated in FIGS. 6, 7, and 8.

The present invention described above are to be regarded in all respects as being illustrative and nonrestrictive. Accordingly, the present invention may be embodied in other specific forms without deviating from the spirit thereof. The present invention is therefore to be limited only by the scope of the following claims.

I claim:

1. An air flow guiding structure for an automobile comprising:

a trunk lid;

a main body having a fixed board and a movable board, said fixed board being positioned on said trunk lid such that said fixed board is separated from said trunk lid by a predetermined distance, said movable board extending slantingly from a rear longitudinal side of said fixed board such that an upper surface of said movable board and an upper surface of said fixed board form a predetermined angle;

two fastening seats mounted on said trunk lid, said two fastening seats supporting said main body on said trunk lid, said fixed board being fixedly fastened to said two fastening seats, said movable board being pivotally fastened to said fastening seats by a plurality of pivoting bolts;

two wing plates fastened respectively to opposite longitudinal ends of said fixed board such that said upper surface of said fixed board forms a right angle with a surface of each of said two wing plates, each of said two wing plates having an arcuate guide slot formed therein corresponding in profile to a moving path of respective longitudinal ends of said moving board, said arcuate guide slot receiving a bolt extending from the longitudinal end of said moving board so as to guide a fluttering movement of said movable board; and two elastic connection means being disposed between said movable board and said fastening seats, said connection means for allowing said movable board to move up and down on said plurality of pivoting bolts.

2. The structure of claim 1, wherein each of said two elastic connection means comprises a compression spring.

* * * * *